US010432730B1

(12) United States Patent
Prentice

(10) Patent No.: US 10,432,730 B1
(45) Date of Patent: Oct. 1, 2019

(54) APPARATUS AND METHOD FOR BUS PROTECTION

(71) Applicant: Government of the United States as represented by the Secretary of the Air Force, Wright-Patterson AFB, OH (US)

(72) Inventor: David C Prentice, Springboro, OH (US)

(73) Assignee: UNITED STATES OF AMERICA AS REPRESENTED BY THE SECRETARY OF THE AIR FORCE, Wright-Patterson AFB, OH (US)

(*) Notice: Subject to any disclaimer, the term of this patent is extended or adjusted under 35 U.S.C. 154(b) by 0 days.

(21) Appl. No.: 15/415,076

(22) Filed: Jan. 25, 2017

(51) Int. Cl.
*H04L 29/06* (2006.01)
*H04L 29/08* (2006.01)
*G09B 9/16* (2006.01)

(52) U.S. Cl.
CPC ............ *H04L 67/12* (2013.01); *G09B 9/16* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 5,093,910 A | 3/1992 | Tulpule et al. | |
| 5,113,499 A | 5/1992 | Ankney et al. | |
| 5,293,375 A | 3/1994 | Moorwood et al. | |
| 5,325,359 A | 6/1994 | Jordan et al. | |
| 5,764,634 A | 6/1998 | Christensen et al. | |
| 5,764,895 A | 6/1998 | Chung | |
| 5,768,162 A | 6/1998 | Rupp et al. | |
| 5,818,654 A | 10/1998 | Reddy et al. | |
| 5,916,300 A | 6/1999 | Kirk et al. | |
| 6,175,560 B1 | 1/2001 | Bhagalia et al. | |
| 6,195,768 B1 | 2/2001 | Green | |

(Continued)

FOREIGN PATENT DOCUMENTS

| | | |
|---|---|---|
| WO | WO2014/139406 | 9/2014 |
| WO | WO2016/165683 | 10/2016 |
| WO | WO2017/050150 | 3/2017 |

OTHER PUBLICATIONS

Department of Defense US, MIL-STD-1553B, Military Standard: Aircraft Internal Time Division Command/Response Multiplex Data Bus (Sep. 21, 1978).

(Continued)

*Primary Examiner* — Andrew J Steinle
(74) *Attorney, Agent, or Firm* — AFMCLO/JAZ; Charles R. Figer, Jr.

(57) ABSTRACT

An apparatus for inhibiting data on a bi-directional bus includes a first portion having a first analog port and a digital output. A second portion has a second analog port and a digital input, and the digital output is operably coupled to the first digital input. The digital output of the first portion is configured to produce a digital representation of an analog input signal presented to the first analog port. Likewise, the second analog port of the second portion is configured to produce an analog output representation of a digital signal presented to the digital input. The first and second portion cooperate to inhibit the propagation of data presented to the second analog port as an input.

12 Claims, 1 Drawing Sheet

(56) References Cited

U.S. PATENT DOCUMENTS

| | | |
|---|---|---|
| 6,285,298 B1 | 9/2001 | Gordon |
| 6,778,160 B2 | 8/2004 | Kubota et al. |
| 7,046,992 B2 | 5/2006 | Wallentin et al. |
| 7,096,137 B2 | 8/2006 | Shipton et al. |
| 7,194,663 B2 | 3/2007 | Fletcher et al. |
| 7,284,272 B2 | 10/2007 | Howard et al. |
| 7,337,465 B2 | 2/2008 | Kiyoto et al. |
| 7,340,597 B1 | 3/2008 | Cheriton |
| 7,376,111 B2 | 5/2008 | Moreton |
| 7,480,500 B1 | 1/2009 | Mittal |
| 7,587,499 B1 | 9/2009 | Haghpassand |
| 7,760,882 B2 | 7/2010 | Tidwell et al. |
| 7,889,715 B2 | 2/2011 | Criddle et al. |
| 7,908,480 B2 | 3/2011 | Firestone et al. |
| 7,913,011 B2 | 3/2011 | Emma |
| 7,934,088 B2 | 4/2011 | Wang |
| 8,238,551 B2 | 8/2012 | Reznik et al. |
| 8,254,574 B2 | 8/2012 | Reznik et al. |
| 8,312,320 B2 | 11/2012 | Almadi et al. |
| 8,335,609 B2 | 12/2012 | Beacham et al. |
| 8,350,749 B1 | 1/2013 | Malas et al. |
| 8,438,628 B2 | 5/2013 | Shah et al. |
| 8,503,673 B2 | 8/2013 | Patwari et al. |
| 8,515,061 B2 | 8/2013 | Patwari et al. |
| 8,542,719 B2 | 9/2013 | Lassini et al. |
| 8,543,260 B2 | 9/2013 | Righi et al. |
| 8,717,721 B2 | 5/2014 | Rostron |
| 8,744,082 B2 | 6/2014 | Ly et al. |
| 8,863,236 B2 | 10/2014 | Haddad et al. |
| 8,963,741 B1 | 2/2015 | Righi et al. |
| 8,978,467 B2 | 3/2015 | Wagner et al. |
| 9,003,052 B2 | 4/2015 | Holstein et al. |
| 9,225,703 B2 | 12/2015 | Smithson |
| 9,407,619 B2 | 8/2016 | Tunnell et al. |
| 9,582,447 B2 | 2/2017 | Arehart et al. |
| 9,633,484 B2 | 4/2017 | Fazi |
| 9,727,496 B1 | 8/2017 | Parundekar et al. |
| 9,912,531 B2 | 3/2018 | Neff et al. |
| 2002/0130768 A1 | 9/2002 | Che et al. |
| 2002/0174332 A1 | 11/2002 | Vialen et al. |
| 2005/0008157 A1 | 1/2005 | Hjelm |
| 2006/0265540 A1* | 11/2006 | Mass .................... G06F 13/4068 710/305 |
| 2008/0090572 A1 | 4/2008 | Cha et al. |
| 2010/0333172 A1 | 12/2010 | Jiang |
| 2011/0128912 A1 | 6/2011 | Katayama et al. |
| 2014/0331287 A1 | 11/2014 | Barr et al. |
| 2014/0354328 A1* | 12/2014 | Hematy ......... H03K 19/017581 326/38 |
| 2015/0128205 A1 | 5/2015 | Mahaffey et al. |
| 2015/0134947 A1 | 5/2015 | Varcoe et al. |
| 2015/0146872 A1 | 5/2015 | Baek et al. |
| 2015/0236844 A1 | 8/2015 | Pan et al. |
| 2015/0324506 A1* | 11/2015 | Li ....................... G06F 17/5022 703/14 |
| 2017/0026808 A1* | 1/2017 | Johnson ................ H04W 4/046 |
| 2018/0109656 A1 | 4/2018 | Cho et al. |
| 2018/0285309 A1 | 10/2018 | Prentice |

OTHER PUBLICATIONS

Xilinx, Spartan-6 FPGA Data Sheet:DC and Switching Characteristics, DS162 (v3.1.1), Jan. 30, 2015.

Technical Committee SD Card Association, SD Specifications Part 1 Physical Layer Simplified Specification, Ver 4.10, Jan. 22, 2013.

Diligent, Cmod A7 Reference Manual, Rev. B, Jun. 24, 2016.

* cited by examiner

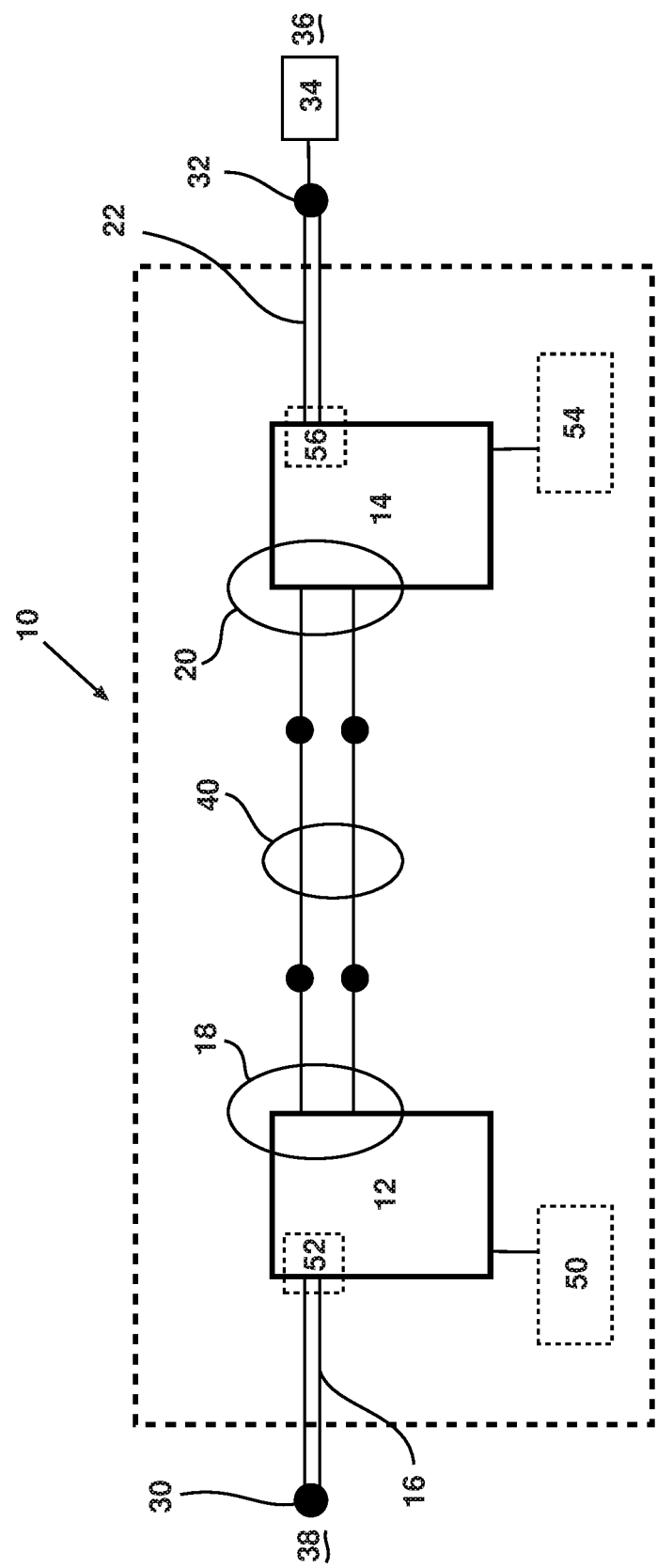

APPARATUS AND METHOD FOR BUS PROTECTION

RIGHTS OF THE GOVERNMENT

The invention described herein may be manufactured and used by or for the Government of the United States for all governmental purposes without the payment of any royalty.

FIELD OF THE INVENTION

The present invention relates generally to cyber security and, more particularly, to safeguarding avionics from anomalies due to programming errors.

BACKGROUND OF THE INVENTION

In recent years, there has been an increased interest with respect to understanding and improving cyber security aspects of aeronautical platforms and weapon systems. This activity involves understanding the potential threat to legacy and future weapon systems; discovering, characterizing, and mitigating cyber related issues; and developing protections to reduce the risk of avionics operating outside of their intended domain.

Before a threat to the internal processing of a system can be mitigated, the particular threat must be generally identified. However, there are circumstances wherein either the risk of loss is so great, or the number and types of viable threats are so varied, that it becomes prudent to employ physical barriers. One method is to provide an air-gap between the protected system and external devices. With the exception of auxiliary channels that will not be discussed herein, in an air-gapped system, data can only enter or leave the system through external media or changes in hardware or firmware. As long as users do not knowingly or unknowingly introduce coding errors into the system, the air-gapped system is robust to a tremendous number of attack vectors.

One such threat could come from adding or changing hardware that is part of the air-gapped system. In an aeronautic platform, a central processor or bus controller, must communicate with numerous peripheral units within the aircraft. Some of these peripheral units are configured to both receive and transmit data over a common bi-directional data bus. Conversely, other peripheral devices are configured to only receive data from the bi-directional bus.

One threat related to peripheral devices is applied to data logging devices or other "receive-only" devices. If a receive-only device is removed and replaced from a system, particular care must be taken to ensure that the contents of the replacement unit have not been adulterated. For example, counterfeit parts entering the supply chain may enable avenues of introducing malicious code. Moreover, since the receive-only device may be surreptitiously modified to enable bi-directional communication on the bi-directional common bus, factory-introduced malicious code would be capable of traveling upstream on the bi-directional common bus.

As a result, there exists an unmet need in the art for improved apparatus and methods for converting a portion of a bi-directional analog channel into a uni-directional channel to counteract any possibility that a device could transmit unknowingly.

SUMMARY OF THE INVENTION

The present invention overcomes the foregoing problems and other shortcomings, drawbacks, and challenges of protecting control systems, having a common bi-directional bus, from unintended code execution. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, an apparatus for inhibiting data on a bi-directional bus is provided. The apparatus includes a first portion having a first analog port and a digital output. A second portion has a second analog port and a digital input, and the digital output is operably coupled to the first digital input. The digital output of the first portion is configured to produce a digital representation of an analog input signal presented to the first analog port. Likewise, the second analog port of the second portion is configured to produce an analog output representation of a digital signal presented to the digital input. The first and second portion cooperate to inhibit the propagation of data presented to the second analog port as an input.

According to another embodiment of the disclosed invention, a method for inhibiting data on a bi-directional bus is provided. The method includes providing a first portion having a first analog port and a digital output. The first portion is configured to translate analog data presented to the first analog port into a digital representation at the digital output while rejecting any input of data to the digital output. A second portion, having a second analog port and a digital input, is also provided. The second portion is configured to translate digital data that is presented to the digital input into an analog representation at the second analog port while rejecting any input of data to the second analog port. The digital output of the first portion is electrically coupled to the digital input of the second portion to permit data to pass in a downstream direction established from the first portion to the second portion, and to inhibit the propagation of data in an upstream direction established from the second portion to the first portion.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 1 depicts a block diagram of an apparatus according to an embodiment of the disclosed invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

In some industrial control system, a common bus is provided to interface with a plurality of processors, sensors, or other peripheral devices. In some embodiments, a bi-directional analog bus is provided to serve as a backbone for such devices. One such example of an analog bi-directional bus is related to use in military avionics systems.

The MIL-STD-1553 avionics bus is a bi-directional (half duplex), analog, balanced line protocol. While optical variations exist, the physical layer of the bus frequently consists of single shielded twisted pair having a characteristic impedance between 70-85 ohms at 1 MHz. Redundant variations exist, wherein a primary and secondary/tertiary channel are provided via independent additional shielded twisted pairs. This enables continued operability in an event that one channel is physically damaged or otherwise disabled.

A plurality of modules, peripherals, or Line Replaceable Units (LRUs) are coupled to the bus, and may be configured to transmit and receive data to other LRUs or a Bus Controller (BC). The LRUs may comprise remote terminals, monitors or data recorders, or the like. While the majority of LRUs require bi-directional access, a non-trivial minority of LRUs are configured to operate as uni-directional units. For example a data logger or a Heads Up Display (HUD) is configured to serve as a receive-only uni-directional device. However, it must be recognized that by interfacing with the bus, a data logger has the potential to access bi-directional capabilities of the bus, and in turn access other LRUs.

The LRUs may be chained together in parallel to the shielded twisted pair bus using twin-axial connectors known to one of ordinary skill in the art. Some LRUs may tap the bus by way of a stub transformer. Such stub transformers are intended to isolate and protect the bus from damaged LRUs connected thereto. For example, an open circuit, or short circuited secondary coil of a stub transformer would be invisible to a bus connected to a corresponding primary coil. Dead ends of the bus are capped using appropriately line-matched resistive terminators.

Embodiments of the disclosed invention are directed to interfacing between a uni-directional LRU (ULRU), and the bus, and are configured to inhibit an ULRU from unintentionally transmitting data or signals (with respect to the disclosed invention, malicious signals, malicious code, and malicious data may be used interchangeably) to the bus.

Turning attention to FIG. 1, an embodiment of a data blocking apparatus 10, according to an embodiment of the disclosed invention, is shown as a block diagram.

The apparatus 10 includes a first portion 12 and a second portion 14. In one embodiment, the first portion 12 may be an analog to digital converter (ADC), and the second portion 14 may be a digital to analog converter (DAC). An analog input 16 is electrically coupled to the first portion 12 in accordance with termination methods and connectorization known to one of ordinary skill in the art. One or more digital outputs 18 of the first portion 12 are electrically coupled to a corresponding number of digital inputs 20 of the second portion 14. The quantity of digital outputs 18 and digital inputs 20 is a function of the resolution of the ADC and DAC, and will vary depending upon design objectives under varied operating environments and conditions.

An analog output 22 is likewise coupled to the second portion 14 in accordance with termination methods and connectorization known to one of ordinary skill in the art. External to the apparatus 10, the analog input 16 establishes an interface with an active bus 30 (the portion of the global bus that is capable of propagating malicious code to other connected LRUs) and the analog output 22 establishes an interface with a protected bus 32 (the portion of the global bus wherein malicious code deposited thereon cannot be propagated to other connected LRUs). A protected ULRU (PLURU) 34 is deemed to be downstream 36 of the apparatus 10, and the active bus 30 is defined as being upstream 38 of the apparatus 10.

In one embodiment, the analog input 16 is coupled to a MIL-STD 1553 active bus 30. When the first portion 12 receives the MIL-STD 1553 signals, it converts them to 2 digital signals (again, the two digital lines 40 are exemplary, and the quantity will vary with design objectives). These digital signals exiting the digital outputs 18 are propagated into the digital inputs 20 of the second portion 14. The signals on the digital inputs 20 of the second portion 14 are decoded and sent to the analog output 22. In sum, the cooperating first portion 12 and second portion 14 replicates the data from the analog input 16 to the analog output 22.

Since the first portion 12 is configured as an ADC, and the second portion 14 is configured as a DAC, the flow of upstream 38 data can pass freely to the downstream 36 direction (and connected PULRU 34). However, since the second portion 14 is configured as a DAC, it is not possible for the second portion 14, to receive data on the analog output 22, and it is further unable to propagate any presented data upstream 38 back through the first portion 12 to the active bus 30. In this way, a unapproved or untested LRU installed as a PULRU 34 between the apparatus 10 and the active bus 30 is rendered impotent with respect to adversely impacting other LRUs upstream 38 on the active bus 30.

The disclosed configuration advantageously establishes the protected bus 32 without having a negative impact on bus traffic latency. It is further noted that disposing the apparatus 10 between a stub transformer and a PULRU 34 serves to protect the active bus 30 only from the PULRU's 34 emissions. However, if the apparatus 10 is inserted at a midpoint of the bus, for example having three upstream 38 LRUs and three downstream 36 LRUs, all downstream 36 LRUs will be capable of communicating with each other while simultaneously being prohibited from forwarding data upstream 38 of the apparatus 10.

In other embodiments of the disclosed invention, the first portion 12 is a commercial off the shelf MIL-STD 1553 capable transceiver, and the second portion 14 is also a commercial off the shelf MIL-STD 1553 capable transceiver. First behavior pins 50 of the first portion 12 transceiver are configured to inhibit transmission and enable reception on at the first analog port 52. Likewise, second behavior pins 54 are configured to enable transmission and inhibit reception at the second analog port 56. Of course, it is possible to configure one of the first portion 12 or second portion 14 as a DAC/ACD, and the alternate one of the first portion 12 or the second portion 14 as an appropriately configured transceiver, should design objectives require.

It will be recognized that depending on the selected transceiver, the first and second behavior pins 50 and 54 may depart from being discrete conductors exiting a chipset. By way of example and not limitation, the behavior pins may be a DIP switch having a plurality of SPDT or SPST switches, a rotary selector, a software selection in a field programmable array emulation, a fusible link, or the like. In any event, tying the behavior pins 50 and 54 to high, ground, or related manipulation thereof, will establish the behavior of the first and second analog ports 52 and 56 to comport with the proper operation of the apparatus 10. Tying the behavior pins 50 or 54 to high, ground, or the like, to yield a desired behavior of the first analog port 52 or second analog port 56, may be referred to as selecting or configuring the behavior pin to produce the desired behavior.

Regardless if the first and second portion 12 and 14 are implemented as DACs or transceivers, the apparatus 10 serves to protect the active bus 30 from electrical problems (such as signal interference, open circuits, short circuits, etc.) arising from physical damage on the downstream 36 side of the apparatus 10. This protection from the aforementioned electrical problems is more robust than the physical protection afforded by stub transformers.

It will be recognized by one of ordinary skill in the art that depending on the protocol used by the native bus, adaptors, converters, conditioners, or the like may be place upstream 38 or downstream 36 of the apparatus 10. Optimally, appropriately selected transceivers would possess such conversion capabilities internally, but the use of adaptors, converters, conditioners, or the like may be applied in conjunction with both transceiver-type embodiments and DAC/ADC capabilities.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus for inhibiting a propagation of data on a bi-directional bus between the bus and a device, the apparatus comprising:
    a first portion having a first analog port and a digital output;
    a second portion having a second analog port and a digital input, wherein the digital output is operably coupled to the digital input;
    wherein the digital output of the first portion is configured to produce a digital representation of an analog input signal presented to the first analog port from the bus;
    wherein the second analog port of the second portion is configured to produce an analog representation of a digital signal presented to the digital input, the analog representation presented to the device; and
    wherein the first and second portion cooperate to inhibit the propagation of data presented to the second analog port as an input from the device.

2. The apparatus of claim 1, wherein the first portion is an analog to digital converter and the second portion is a digital to analog converter.

3. The apparatus of claim 1, wherein the first portion is a transceiver having a behavior pin, and wherein the behavior pin is selected to configure the first analog port to behave only as in input.

4. The apparatus of claim 1, wherein the second portion is a transceiver having a behavior pin, and wherein the behavior pin is selected to configure the second analog port to behave only as an output.

5. The apparatus of claim 3, wherein the transceiver is configured to interface the first analog port with a MIL-STD 1553 bus.

6. The apparatus of claim 4, wherein the transceiver is configured to interface the second analog port with a MIL-STD 1553 bus.

7. A method for inhibiting a propagation of data on a bi-directional bus between the bus and a device, the method comprising:
    providing a first portion having a first analog port and a digital output;
    configuring the first portion to translate analog data presented to the first analog port from the bus into a digital representation at the digital output while rejecting any input of data to the digital output;
    providing a second portion having a second analog port and a digital input;
    configuring the second portion to translate digital data presented to the digital input into an analog representation at the second analog port while rejecting any input of data to the second analog port, the analog representation presented to the device; and
    electrically coupling the digital output of the first portion to the digital input of the second portion to permit the propagation of data to pass in a downstream direction established from the first portion to the second portion, and to inhibit the propagation of data in an upstream direction established from the second portion to the first portion.

8. The method of claim 7, wherein the first portion is an analog to digital converter and the second portion is a digital to analog converter.

9. The method of claim 7, wherein the first portion is a transceiver having a behavior pin, and wherein the behavior pin is selected to configured the first analog port to behave only as in input.

10. The method of claim 7, wherein the second portion is a transceiver having a behavior pin, and wherein the behavior pin is selected to configure the second analog port to behave only as an output.

11. The method of claim 9, wherein the transceiver is configured to interface the first analog port with a MIL-STD 1553 bus.

12. The method of claim 10, wherein the transceiver is configured to interface the second analog port with a MIL-STD 1553 bus.

* * * * *